(12) United States Patent
Kim et al.

(10) Patent No.: US 10,171,201 B2
(45) Date of Patent: Jan. 1, 2019

(54) METHOD AND APPARATUS FOR TRANSMITTING DATA

(71) Applicants: ELECTRONICS AND TELECOMMUNICATIONS RESEARCH INSTITUTE, Daejeon (KR); University-Industry Cooperation Group of Kyung Hee University, Yongin-si, Gyeonggi-do (KR)

(72) Inventors: Kyung Sook Kim, Daejeon (KR); Een Kee Hong, Yongin-si (KR); Ji Hye Park, Yongin-si (KR); Joo Sun Bang, Yongin-si (KR); Dong Seung Kwon, Daejeon (KR); Sung Kyung Kim, Daejeon (KR); Jee Hyeon Na, Daejeon (KR); Jung Mo Moon, Daejeon (KR)

(73) Assignees: ELECTRONICS AND TELECOMMUNICATIONS RESEARCH INSTITUTE, Dajeon (KR); UNIVERSITY-INDUSTRY COOPERATION GROUP OF KYUNG HEE UNIVERSITY, Yongin-Si, Gyeonggi-Do (KR)

( * ) Notice: Subject to any disclaimer, the term of this patent is extended or adjusted under 35 U.S.C. 154(b) by 93 days.

(21) Appl. No.: 15/352,845

(22) Filed: Nov. 16, 2016

(65) Prior Publication Data
US 2017/0142696 A1 May 18, 2017

(30) Foreign Application Priority Data

Nov. 18, 2015 (KR) .................. 10-2015-0161819
Apr. 19, 2016 (KR) .................. 10-2016-0047378

(51) Int. Cl.
*H04L 1/00* (2006.01)
*H04L 5/00* (2006.01)

(52) U.S. Cl.
CPC .......... *H04L 1/0009* (2013.01); *H04L 1/0003* (2013.01); *H04L 1/0026* (2013.01); *H04L 5/0092* (2013.01)

(58) Field of Classification Search
CPC ... H04L 1/0003; H04L 1/0009; H04L 1/0026; H04L 5/0092
(Continued)

(56) References Cited

U.S. PATENT DOCUMENTS

2005/0276266 A1* 12/2005 Terry .................... H04L 1/0003
370/394
2009/0086845 A1* 4/2009 Demirhan ............. H04L 1/0003
375/295
(Continued)

FOREIGN PATENT DOCUMENTS

KR 10-2007-0076297 A 7/2007
KR 10-2015-0145365 A 12/2015

*Primary Examiner* — Mark H Rinehart
*Assistant Examiner* — Kokou R Detse
(74) *Attorney, Agent, or Firm* — LRK Patent Law Firm

(57) ABSTRACT

A data transmission method and apparatus initialize an index of a modulation and coding scheme (MCS) for transmitting data to a terminal, adjust the index of the MCS based on at least one of a hybrid automatic repeat request (HARM) feedback of the terminal and a channel quality of the terminal, and transmit the data to the terminal based on the adjusted index of the MCS.

15 Claims, 11 Drawing Sheets

(58) Field of Classification Search
USPC .......................................................... 370/329
See application file for complete search history.

(56) References Cited

U.S. PATENT DOCUMENTS

| | | |
|---|---|---|
| 2013/0188747 A1 | 7/2013 | Cheong et al. |
| 2013/0310091 A1 | 11/2013 | Tarik Tabet et al. |
| 2014/0254509 A1* | 9/2014 | Chen .................... H04L 5/0058 370/329 |
| 2014/0293899 A1 | 10/2014 | Ko et al. |
| 2015/0271802 A1* | 9/2015 | Kang .................... H04L 5/0092 370/329 |
| 2015/0373732 A1* | 12/2015 | Davydov ................. H04L 5/00 370/329 |

* cited by examiner

100

200

METHOD AND APPARATUS FOR TRANSMITTING DATA

CROSS-REFERENCE TO RELATED APPLICATION(S)

This application claims the priority benefit of Korean Patent Application No. 10-2015-0161819 filed on Nov. 18, 2015 and Korean Patent Application No. 10-2016-0047378 filed on Apr. 19, 2016, in the Korean Intellectual Property Office, the disclosures of which are incorporated herein by reference for all purposes.

BACKGROUND

1. Field

At least one example embodiment relates to technology for providing data transmission, and more particularly, to a method and apparatus for transmitting data using wireless communication.

2. Description of Related Art

In a long term evolution (LTE) system, a modulation and coding scheme (MCS) used by a physical downlink shared channel may be determined based on a status of a network, based on a channel quality indicator (CQI) transmitted from a terminal. If the status of the network is excellent, a process of modulating and coding data may be simplified to enhance a data rate. On the contrary, if the status of the network is poor, the process of modulating and coding data may increase to enhance a data reception rate.

Korean Patent Publication No. 10-2007-0076297, published on Jul. 24, 2007, discloses a method of transmitting and receiving data. The disclosed method determines an MCS level to be used for data, generates the data as a codeword that includes data and a parity by coding the data based on the determined MCS level, generates the codeword as symbols coded to correspond to an incremental redundancy (IR) scheme, and transmits each of the coded symbols through a corresponding subframe, such that a data reception apparatus restores data at an MCS level corresponding to a channel status of the data reception apparatus

SUMMARY

At least one example embodiment provides an apparatus and method for transmitting data.

At least one example embodiment also provides a method and apparatus that may adjust an index of a modulation and coding scheme (MCS) used to transmit data.

According to an aspect of at least one example embodiment, there is provided a method of transmitting data, the method including initializing an index of an MCS for transmitting data to a terminal; adjusting the index of the MCS based on at least one of a hybrid automatic repeat request (HARQ) feedback of the terminal and a channel quality of the terminal; and transmitting the data to the terminal based on the adjusted index of the MCS.

The data transmission method may further include setting a target block error ratio (BLER). The adjusting may include adjusting the index of the MCS based on the target BLER.

The adjusting may include determining whether at least one HARQ feedback is received; and adjusting the index of the MCS based on the at least one HARQ feedback in response to reception of the at least one HARQ feedback.

The adjusting of the index of the MCS based on the at least one HARQ feedback may include adjusting the index of the MCS based on a number of consecutively received acknowledge (ACK) feedbacks.

The adjusting may include determining whether information about the channel quality of the terminal is received; and adjusting the index of the MCS based on information about the channel quality of the terminal in response to reception of information about the channel quality of the terminal.

The adjusting and the transmitting may be performed to transmit a t-th subframe, and the initializing may include initializing the index of the MCS by determining an index of an MCS determined to transmit a (t−1)-th subframe as the index of the MCS.

The adjusting and the transmitting may be performed within a single transmission time interval (TTI).

The adjusting may include determining an index of a first MCS based on the HARQ feedback; determining an index of a second MCS based on the channel quality of the terminal; and determining the index of the MCS based on the index of the first MCS and the index of the second MCS.

The determining of the index of the MCS based on the index of the first MCS and the index of the second MCS may include determining the index of the MCS based on a first weight predetermined for the index of the first MCS and a second weight predetermined for the index of the second MCS.

A sum of the first weight and the second weight may be 1.

The transmitting may be performed in response to receiving a scheduling request for transmitting the data.

The adjusting may include adjusting the index of the MCS using the HARQ feedback of the terminal, based on a reception period of the channel quality of the terminal; and adjusting the index of the MCS using the HARQ feedback and the channel quality of the terminal based on the reception period of the channel quality of the terminal.

According to an aspect of at least one example embodiment, there is provided a data transmission apparatus including a processor configured to initialize an index of an MCS for transmitting data to a terminal, and to adjust the index of the MCS based on at least one of a HARQ feedback of the terminal and a channel quality of the terminal; and a communicator configured to transmit the data to the terminal based on the adjusted index of the MCS.

The processor may be further configured to set a target BLER, and adjust the index of the MCS based on the target BLER.

The processor may be further configured to determine whether at least one HARQ feedback is received, and adjust the index of the MCS based on the at least one HARQ feedback in response to reception of the at least one HARQ feedback.

The processor may be further configured to determine whether information about the channel quality of the terminal is received, and adjust the index of the MCS based on information about the channel quality of the terminal in response to reception of information about the channel quality of the terminal.

The processor may be further configured to determine an index of a first MCS based on the HARQ feedback, determine an index of a second MCS based on the channel quality of the terminal, and determine the index of the MCS based on the index of the first MCS and the index of the second MCS.

The processor may be further configured to determine the index of the MCS based on a first weight predetermined for the index of the first MCS and a second weight predetermined for the index of the second MCS.

The processor may be further configured to adjust the index of the MCS using the HARQ feedback of the terminal based on a reception period associated with information about the channel quality of the terminal, and adjust the index of the MCS using the HARQ feedback and the channel quality of the terminal based on the reception period of the channel quality of the terminal.

According to example embodiments, there may be provided a method and apparatus for transmitting data.

Also, according to example embodiments, there may be provided a method and apparatus for adjusting an index of an MCS used to transmit data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
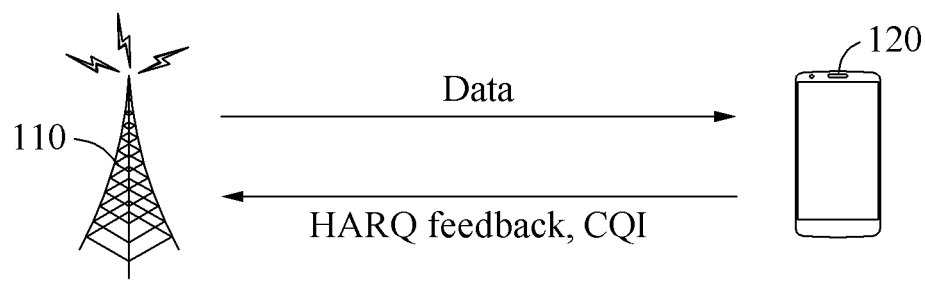
FIG. 1 illustrates an example of a data transmission system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an example of a data transmission system according to an example embodiment.

Referring to FIG. 1, a data transmission system 100 includes a base station 110 configured to transmit data and a terminal 120, for example, a mobile station, configured to receive data.

The base station 110 may transmit data using a long term evolution-advanced (LTE-A) system developed from a $3^{rd}$ generation partnership project (3GPP) LTE Rel-8 system. The LTE-A system employs a component carrier aggregation (CCA) technology to expand a bandwidth. For example, the LTE-A system may support a total of 100 MHz bandwidth by combining five bandwidths of 20 MHz. The LTE-A system may include an entity configured to process a hybrid automatic retransmit request (HARQ) for each carrier. Since a HARQ entity is present for each carrier, the LTE-A system may support a carrier aggregation. Although it is described that the base station 110 uses the LTE-A system, there is no constraint on a communication system applied to the base station 110.

The terminal 120 may receive data from the base station 110. For example, the terminal 120 may receive data transmitted through each carrier. In response to data received at the terminal 120, the terminal 120 may transmit an acknowledge (ACK) feedback to the base station 110. In response to a failure in receiving data, the terminal 120 may transmit a negative-acknowledge (NACK) feedback to the base station 110.

The terminal 120 may transmit, to the base station 110, information indicating a channel quality between the base station 110 and the terminal 120. For example, the terminal 120 may periodically transmit, to the base station 110, data that includes a channel quality indicator (CQI).

The base station 110 may transmit, to the terminal 120, data that is modulated and encoded by applying a determined MCS to the data. The MCS to be applied to data may be determined based on at least one of a HARQ feedback and a channel quality. According to an increase in the HARQ feedback and the channel quality, an MCS level may increase. If a high level of MCS is applied to data, a data rate may increase. Hereinafter, a data transmission method will be further described with reference to FIGS. 2 through 6.

Figure 2:
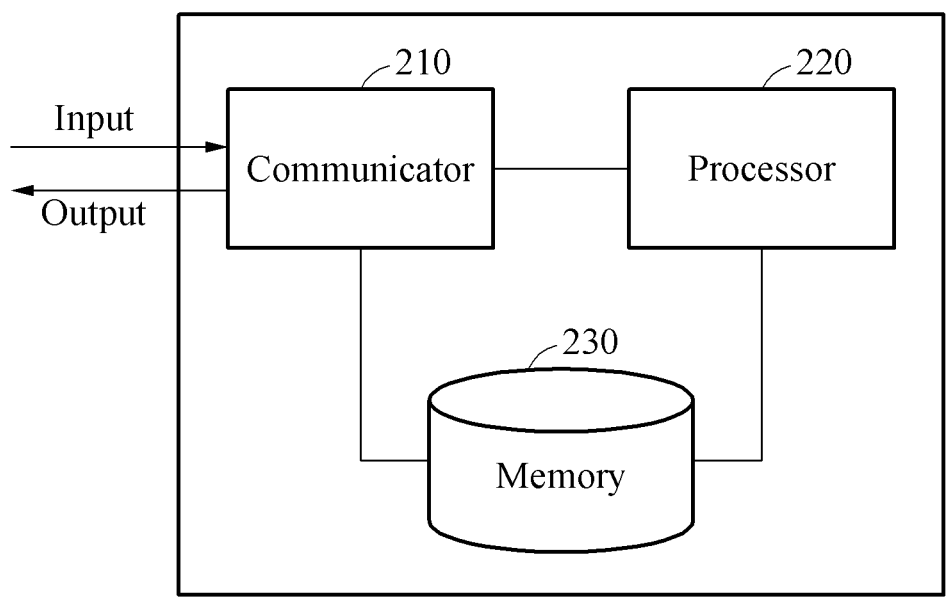
FIG. 2 is a block diagram illustrating a configuration of a data transmission apparatus according to an example embodiment.

FIG. 2 is a block diagram illustrating a configuration of a data transmission apparatus according to an example embodiment.

Referring to FIG. 2, a data transmission apparatus 200 may include a communicator 210, a processor 220, and a memory 230. For example, the data transmission apparatus 200 may correspond to the base station 110 of FIG. 1.

The communicator 210 may exchange data with an external terminal. For example, the communicator 210 may receive data from mobile communication terminals present around the data transmission apparatus 200, and may transmit data to the mobile communication terminals.

The processor 220 may process data received at the communicator 210 and data stored in the memory 220.

The communicator 210, the processor 220, and the memory 230 will be further described with reference to FIGS. 3 through 6.

Figure 3:
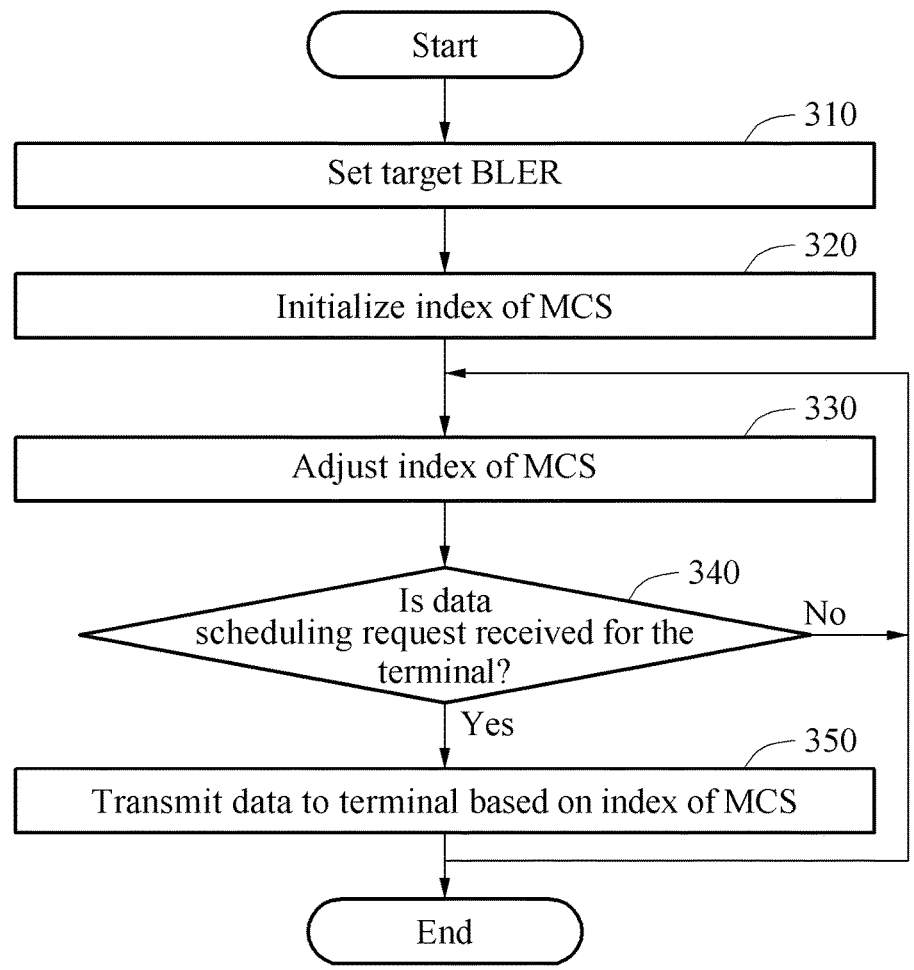
FIG. 3 is a flowchart illustrating a data transmission method according to an example embodiment.

FIG. 3 is a flowchart illustrating a data transmission method according to an example embodiment.

In operation 310, the processor 220 sets a target block error ratio (BLER).

In operation 320, the processor 220 initializes an index of an MCS. The index of the MCS may be an index for determining the MCS. For example, if the index of the MCS is high, the MCS having a high data rate may be applied to data. As another example, if the index of the MCS is low, the MCS having a low data rate may be applied to data. Data to which the MCS having the low data rate is applied may be robust against noise when transmitting data.

The processor 220 may initialize the index of the MCS by determining an index of an MCS determined to transmit a (t−1)-th subframe as an index of an MCS for transmitting a t-th subframe.

The following operations 330 through 350 may be performed within a single transmission time interval (TTI) among a plurality of TTIs for transmitting the t-th subframe.

In operation 330, the processor 220 adjusts the index of the MCS. Prior to performing operation 330, at least one of a HARQ feedback and a channel quality of a terminal may be received from the terminal. The processor 220 may adjust the index of the MCS based on at least one of the HARQ feedback and the channel quality received from the terminal. A method of adjusting the index of the MCS will be described with reference to FIGS. 4 through 6.

In operation 340, the processor 220 determines whether a downlink or an uplink data scheduling request is received for the terminal. When the data scheduling request is received, operation 350 may be performed.

In operation 350, the processor 220 modulates and encodes data based on the adjusted index of the MCS. The communicator 210 may transmit the modulated and encoded data to the terminal.

Figure 4:
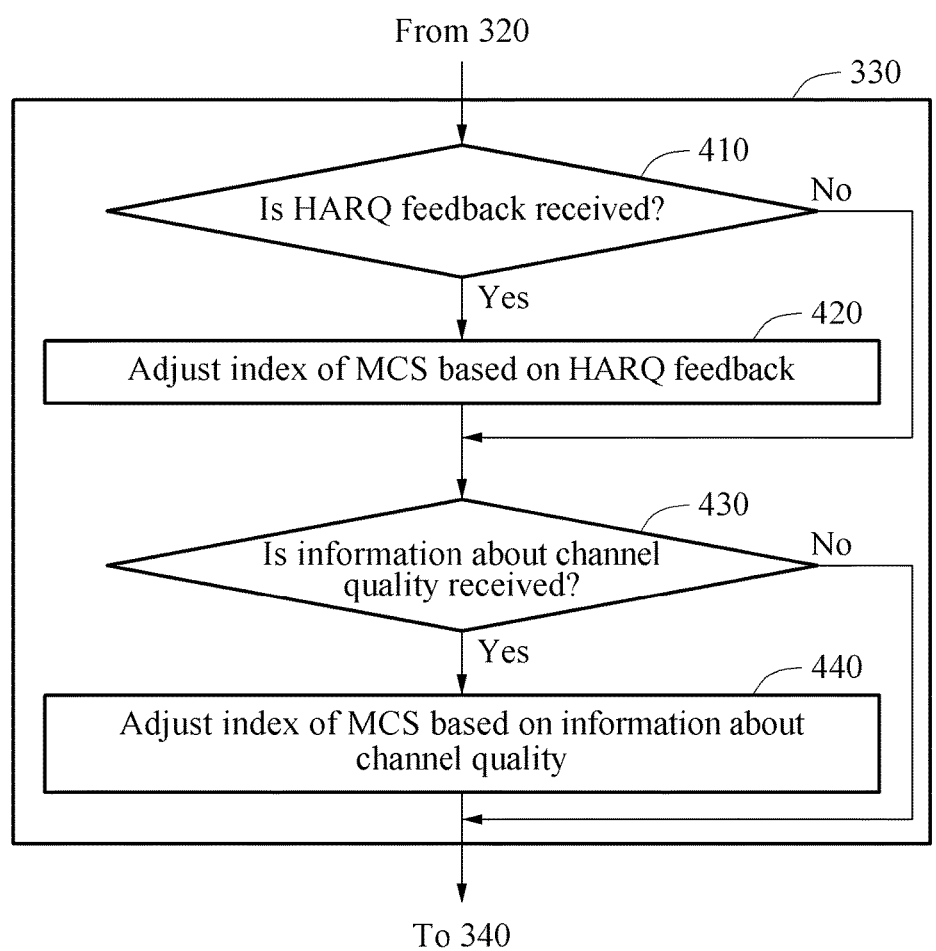
FIG. 4 is a flowchart illustrating an example of an operation of adjusting an index of a modulation and coding scheme (MCS) according to an example embodiment.

FIG. 4 is a flowchart illustrating an example of an operation of adjusting an index of an MCS according to an example embodiment.

Operation 330 of FIG. 3 may include operations 410 through 440 of FIG. 4.

In operation 410, the processor 220 determines whether at least one HARQ feedback is received from the terminal. The HARQ feedback may include an ACK feedback and a NACK feedback.

In operation 420, when the at least one HARQ feedback is received, the processor 220 adjusts the index of the MCS based on the HARQ feedback. For example, the processor 220 may adjust the index of the MCS based on a target BLER, a number of ACK feedbacks, and a number of NACK feedbacks. The index of the MCS adjusted based on the target BLER, the number of ACK feedbacks, and the number of NACK feedbacks may be defined as the following Equation 1.

MCS index($i$)=MCS index($i$−1)'+(number of ACK feedbacks×step size)−($K$×number of NACS feedbacks×step size)   [Equation 1]

In Equation 1, MCS index(i) of a left item denotes an index of an MCS adjusted in an i-th TTI among TTIs for transmitting the t-th subframe. MCS index(i−1) of a right term denotes an index of an MCS before adjustment. For example, MCS index(i−1) may denote an index of an (i−1)-th MCS. Step size denotes a value for fitting a scale between a size of the index of the MCS and the number of HARQ feedbacks, and may be determined in advance based on a system performance. K is calculated according to Equation 2. The target BLER denotes a ratio ($P_{NACK}$) of NACK feedback with respect to the entire HARQ feedbacks.

$$K = \frac{MCS\Delta\text{Down}}{MCS\Delta\text{Up}} = \frac{1 - P_{NACK}}{P_{NACK}},$$   [Equation 2]

Target $BLER = P_{NACK}$

For example, if MCS index(i−1)=5, step size=0.1, target BLER=0.1, number of ACK feedbacks=72, and number of NACK feedbacks=8, MCS index(i) is calculated as 5. In the above example, a value of MCS index(i−1) is equal to a value of MCS index(i). If the values are equal, it indicates that a current MCS level satisfies the target BLER. If an actually calculated BLER is greater than the target BLER, the MCS level may decrease. If the actually calculated BLER is less than the target BLER, the MCS level may increase.

The index of the MCS may be adjusted based on the number of consecutively received ACK feedbacks. For example, if the number of ACK feedbacks is received or accumulated to be greater than or equal to a preset threshold, the processor 220 may increase a value of the index of the MCS.

In operation 430, the processor 220 determines whether information about the channel quality of the terminal is received. For example, information about the channel quality may be a CQI included in data transmitted from the terminal.

In operation 440, if information about the channel quality is received, the processor 220 adjusts the index of the MCS based on information about the channel quality. The index of the MCS adjusted based on information about the channel quality may be defined as Equation 3.

MCS index($i$)=(MCS index(ACK/NACK)×first weight)+(MCS index(CQI)×second weight)   [Equation 3]

In Equation 3, MCS index(ACK/NACK) denotes the index of the MCS adjusted according to Equation 1. MCS index(CQI) denotes the index of the MCS determined based on a value of a CQI. A sum of a first weight and a second weight is 1. That is, Equation 3 relates to a method of adjusting the index of the MCS based on all of the HARQ feedback and the channel quality of the terminal. For example, if MCS index(ACK/NACK)=5, first weight=0.6, MCS index(CQI)=8, and second weight=0.4, MCS index(i) =6.2. Since the index of the MCS is an integer, the index of the MCS is adjusted to be 6.

Figure 5:
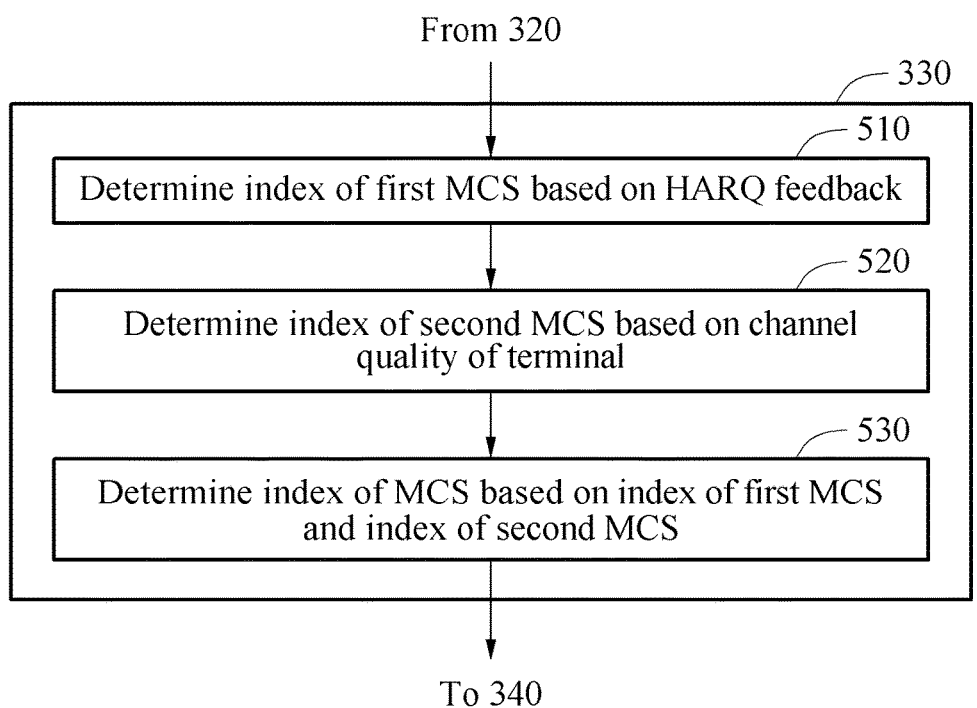
FIG. 5 is a flowchart illustrating another example of an operation of adjusting an index of an MCS according to an example embodiment.

FIG. 5 is a flowchart illustrating another example of an operation of adjusting an index of an MCS according to an example embodiment.

Operation 330 of FIG. 3 may include operations 510 through 530 of FIG. 5.

In operation 510, the processor 220 determines an index of a first MCS based on the HARQ feedback. The index of the first MCS may be determined according to Equation 1.

In operation 520, the processor 220 determines an index of a second MCS based on the channel quality of the terminal. For example, the index of the second MCS may be determined based on a value of the CQI transmitted from the terminal. The index of the second MCS may be MCS index(CQI) of Equation 3.

In operation 530, the processor 220 determines the index of the MCS based on the index of the first MCS and the index of the second MCS. For example, the processor 220 may determine the index of the MCS according to Equation 3. The index of the first MCS may correspond to MCS index(ACK/NACK) and the index of the second MCS may correspond to MCS index(CQI). The first weight may be determined in advance with respect to the index of the first MCS and the second weight may be determined in advance with respect to the index of the second MCS. A sum of the first weight and the second weight is 1.

Figure 6:
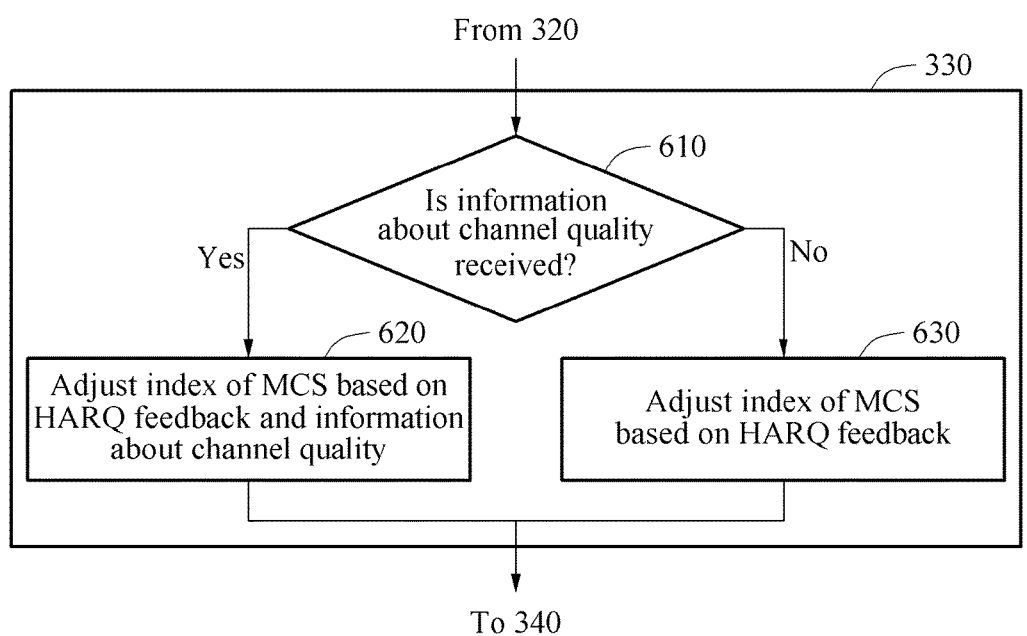
FIG. 6 is a flowchart illustrating still another example of an operation of adjusting an index of an MCS according to an example embodiment.

FIG. 6 is a flowchart illustrating still another example of an operation of adjusting an index of an MCS according to an example embodiment.

Operation 330 of FIG. 3 may include operations 610 through 630 of FIG. 6. Operations 610 through 630 may be performed in a single TTI. The TTI may be an MCS index adjustment interval. For example, the MCS index adjustment interval may be equal to a HARQ feedback reception interval.

In operation 610, the processor 220 determines whether information about the channel quality is received. For example, if a CQI is received from the terminal at intervals of 80 milliseconds (ms), the processor 220 may determine that information about the channel quality is received in a corresponding interval. For example, if operation 610 is performed at intervals of 40 ms, information about the channel quality may be determined not to have been received in intervals 40 ms and 120 ms among intervals 40 ms, 80 ms, 120 ms, and 160 ms from a start time, and information about the channel quality may be determined to have been received in intervals 80 ms and 160 ms.

In operation 620, if information about the channel quality is received, the processor 220 adjusts the index of the MCS based on information about the channel quality and the HARQ feedback. For example, the processor 220 may adjust the index of the MCS according to Equation 3.

In operation 630, if information about the channel quality is not received, the processor 220 adjusts the index of the MCS based on only the HARQ feedback. For example, the processor 220 may adjust the index of the MCS according to Equation 1.

Figure 7:
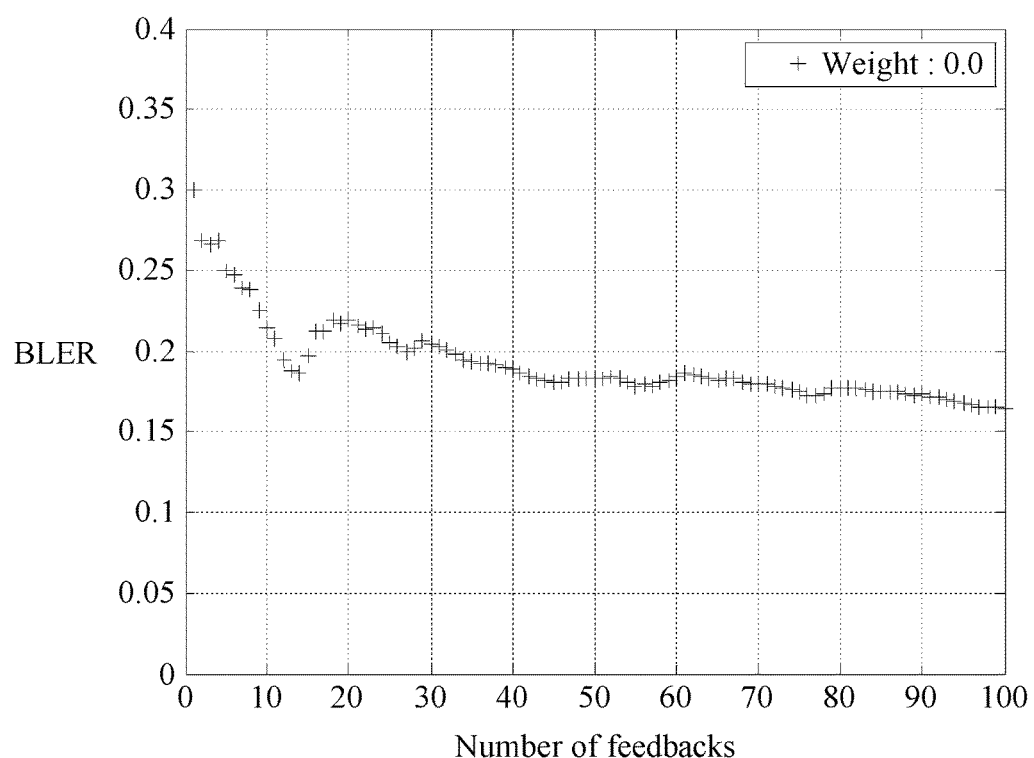
FIGS. 7 and 8 are graphs showing a block error ratio measured with respect to an index of an MCS adjusted based on a hybrid automatic repeat request (HARQ) feedback and a channel quality according to an example embodiment.
Figure 8:
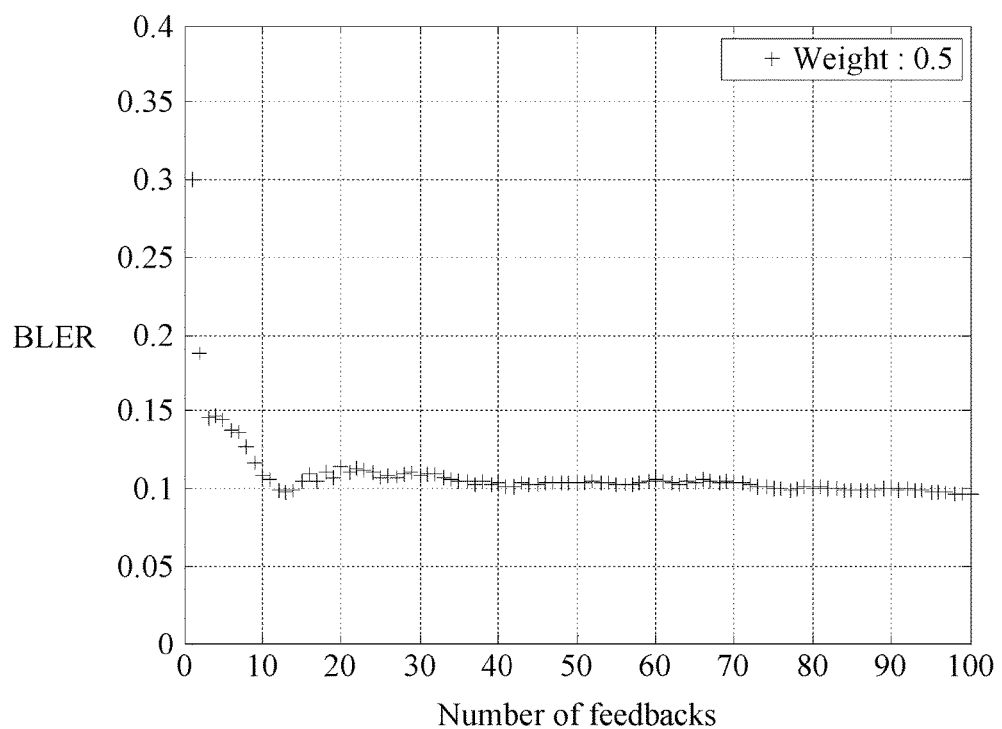

FIGS. 7 and 8 are graphs showing a block error ratio measured with respect to an index of an MCS adjusted based on a HARQ feedback and a channel quality according to an example embodiment.

FIG. 7 is a graph showing an average BLER of data transmitted based on an index of an MCS that is adjusted based on information about a channel quality if first weight=0 and second weight=1. That is, FIG. 7 shows an example of adjusting the index of the MCS based on information about the channel quality alone.

FIG. 8 is a graph showing an average BLER of data transmitted based on an index of an MCS that is adjusted based on a HARQ feedback and information about a channel quality.

Comparing results of FIGS. 7 and 8, it can be known that if the index of the MCS adjusted based on the HARQ feedback and information about the channel quality is used, an actual BLER is approximate to a target BLER, which is set to 0.1.

Figure 9:
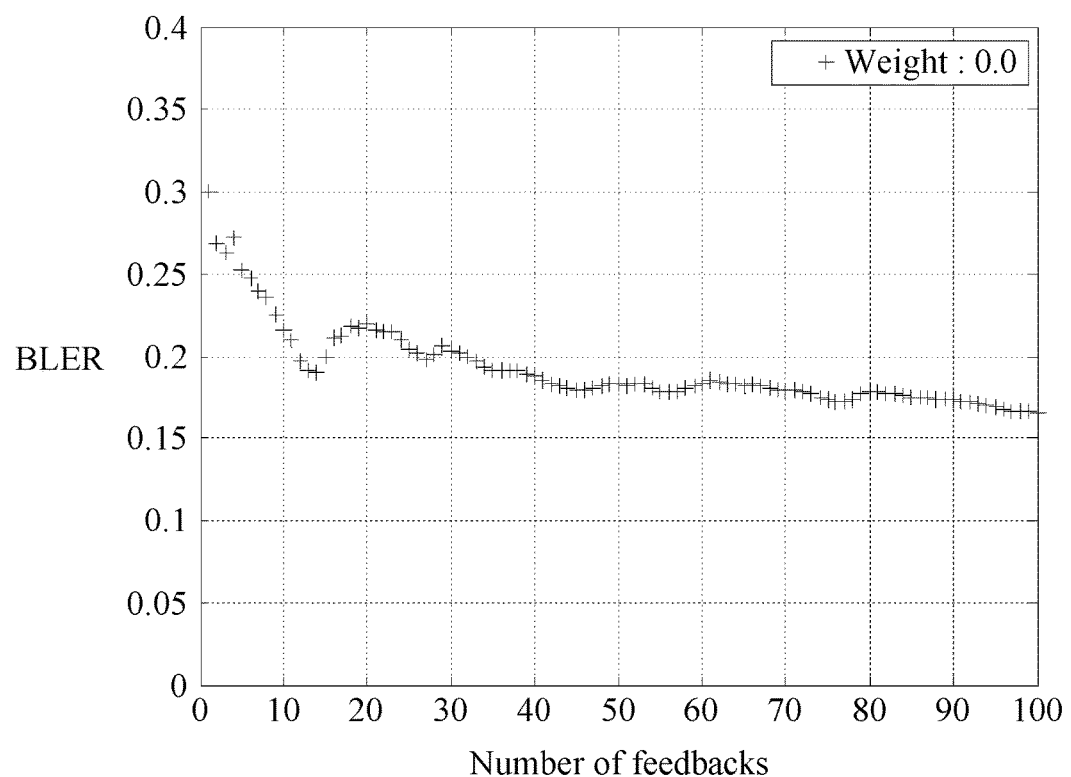
FIGS. 9 and 10 are graphs showing a block error ratio measured with respect to an index of an MCS adjusted based on a number of consecutively received acknowledge (ACK) feedbacks according to an example embodiment.
Figure 10:
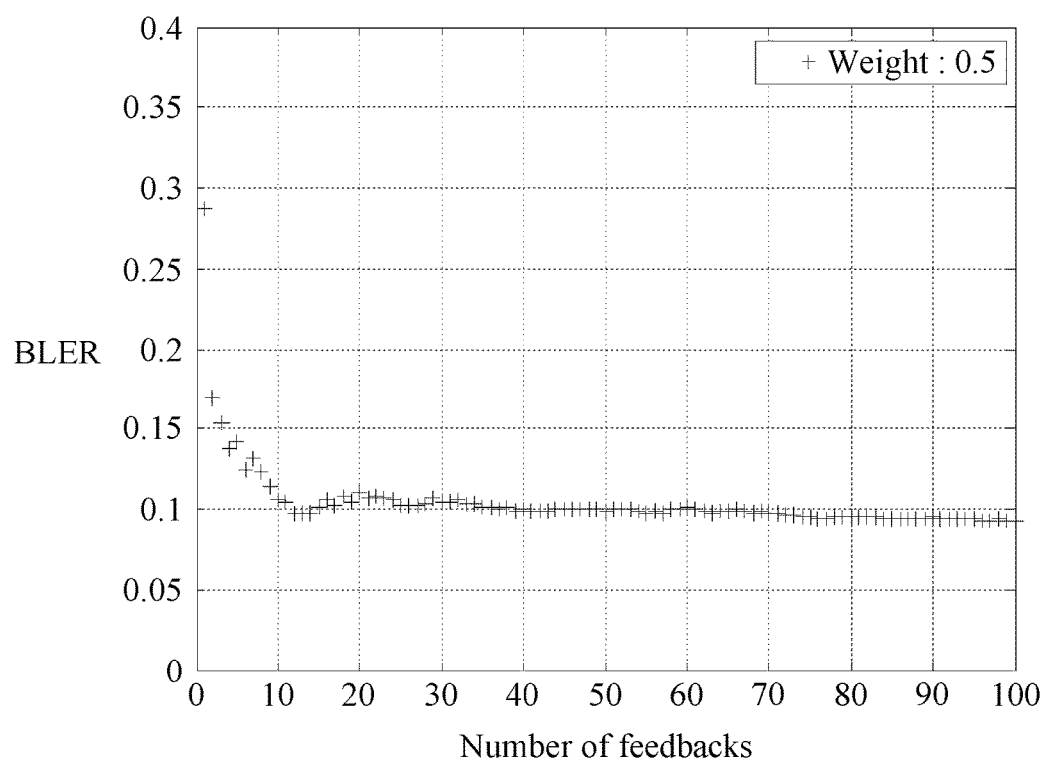

FIGS. 9 and 10 are graphs showing a block error ratio measured with respect to an index of an MCS adjusted based on a number of consecutively received ACK feedbacks according to an example embodiment.

FIG. 9 is a graph showing an average BLER of data using the same condition as FIG. 7, and FIG. 10 is a graph showing an average BLER of data using the same condition as FIG. 8.

Comparing results of FIGS. 9 and 10, it can be known that the result of FIG. 10 is approximate to the target BLER, which is set to 0.1, compared to the result of FIG. 9.

Figure 11:
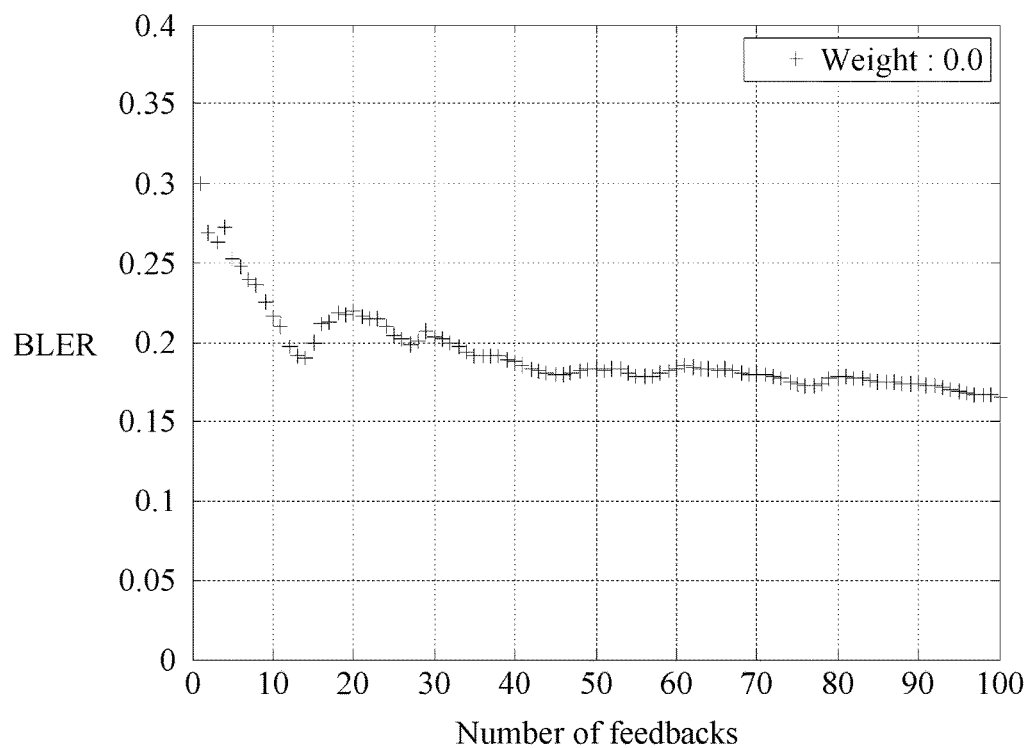
FIGS. 11 and 12 are graphs showing a block error ratio measured with respect to a periodically adjusted index of an MCS according to an example embodiment.
Figure 12:
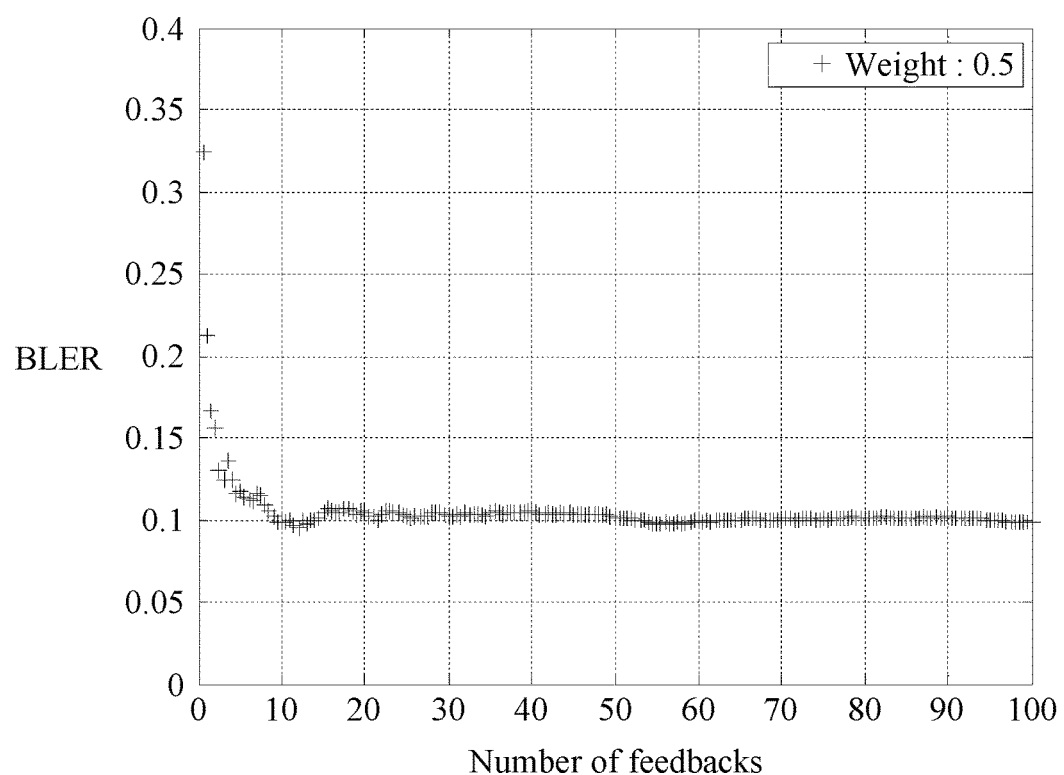

FIGS. 11 and 12 are graphs showing a block error ratio measured with respect to a periodically adjusted index of an MCS according to an example embodiment.

FIG. 11 is a graph showing an average BLER of data transmitted based on the index of the MCS that is adjusted per interval at which information about the channel quality is received into consideration of only the information.

FIG. 12 is a graph showing an average BLER of data transmitted based on the index of the MCS that is adjusted by using only the HARQ feedback per interval at which information about the channel quality is not received and by using the HARQ feedback and information about the channel quality in interval at which information about the channel quality is received.

Comparing results of FIGS. 11 and 12, it can be seen that the result of 12 is approximate to the target BLER, which is set to 0.1, compared to the result of FIG. 11.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computer implemented method of transmitting data, the method comprising:
   initializing an index of a modulation and coding scheme (MCS) for transmitting data to a terminal;
   adjusting, by a processor, the index of the MCS based on at least one of a hybrid automatic repeat request (HARQ) feedback of the terminal and a channel quality of the terminal; and
   transmitting the data to the terminal based on the adjusted index of the MCS, wherein adjusting the index of the MCS is performed by
   determining an index of a first MCS based on the HARQ feedback;
   determining an index of a second MCS based on the channel quality of the terminal; and
   determining the index of the MCS based on the index of the first MCS and the index of the second MCS, and wherein
   determining the index of the MCS based on the index of the first MCS and the index of the second MCS comprises determining the index of the MCS based on sum of a first weight predetermined for the index of the first MCS and a second weight predetermined for the index of the second MCS.

2. The method of claim 1, further comprising:
   setting a target block error ratio (BLER), wherein the adjusting comprises adjusting the index of the MCS based on the target BLER.

3. The method of claim 1, wherein the adjusting comprises:
   determining whether at least one HARQ feedback is received; and
   adjusting the index of the MCS based on the at least one HARQ feedback in response to reception of the at least one HARQ feedback.

4. The method of claim 3, wherein the adjusting of the index of the MCS based on the at least one HARQ feedback comprises adjusting the index of the MCS based on a number of consecutively received acknowledge (ACK) feedbacks.

5. The method of claim 1, wherein the adjusting comprises:
   determining whether information about the channel quality of the terminal is received; and
   adjusting the index of the MCS based on information about the channel quality of the terminal in response to reception of information about the channel quality of the terminal.

6. The method of claim 1, wherein:
   the adjusting and the transmitting is performed to transmit a t-th subframe, and the initializing comprises initializing the index of the MCS by determining an index of an MCS determined to transmit a (t−1)-th subframe as the index of the MCS.

7. The method of claim 1, wherein the adjusting and the transmitting is performed within a single transmission time interval (TTI).

8. The method of claim 1, wherein a sum of the first weight and the second weight is 1.

9. The method of claim 1, wherein the transmitting the data to the terminal is performed in response to reception of a scheduling request for transmitting the data.

10. The method of claim 1, wherein the adjusting comprises:
    adjusting the index of the MCS using the HARQ feedback of the terminal, based on a reception period of the channel quality of the terminal; and adjusting the index of the MCS using the HARQ feedback and the channel quality of the terminal based on the reception period of channel quality of the terminal.

11. A data transmission apparatus comprising:
    a processor configured to initialize an index of a modulation and coding scheme (MCS) for transmitting data to a terminal, and to adjust the index of the MCS based on at least one of a hybrid automatic repeat request (HARQ) feedback of the terminal and a channel quality of the terminal; and
    a communicator configured to transmit the data to the terminal based on the adjusted index of the MCS, wherein adjustment of the index of the MCS is performed by the processor to determine an index of a first MCS based on the HARQ feedback;

to determine an index of a second MCS based on the channel quality of the terminal; and to determine the index of the MCS based on the index of the first MCS and the index of the second MCS, wherein the processor is further configured to determine the index of the MCS based on sum of a first weight predetermined for the index of the first MCS and a second weight predetermined for the index of the second MCS.

12. The data transmission apparatus of claim 11, wherein the processor is further configured to:

set a target block error ratio (BLER), and adjust the index of the MCS based on the target BLER.

13. The data transmission apparatus of claim 11, wherein the processor is further configured to:

determine whether at least one HARQ feedback is received, and adjust the index of the MCS based on the at least one HARQ feedback in response to reception of the at least one HARQ feedback.

14. The data transmission apparatus of claim 11, wherein the processor is further configured to:

determine whether information about the channel quality of the terminal is received, and adjust the index of the MCS based on information about the channel quality of the terminal in response to reception of information about the channel quality of the terminal.

15. The data transmission apparatus of claim 11, wherein the processor is further configured to:

adjust the index of the MCS using the HARQ feedback of the terminal based on a reception period associated with information about the channel quality of the terminal, and adjust the index of the MCS using the HARQ feedback and the channel quality of the terminal based on the reception period of the channel quality of the terminal.

* * * * *